US009432457B2

(12) United States Patent
Marano et al.

(10) Patent No.: US 9,432,457 B2
(45) Date of Patent: Aug. 30, 2016

(54) REDIRECTING LOCAL STORAGE TO CLOUD STORAGE (71) Applicant: CITRIX SYSTEMS, INC., Fort Lauderdale, FL (US)

(72) Inventors: Adam L. Marano, Parkland, FL (US); Lee Laborczfalvi, Freiburg (DE)

(73) Assignee: Citrix Systems, Inc., Fort Lauderdale, FL (US)

( * ) Notice: Subject to any disclaimer, the term of this patent is extended or adjusted under 35 U.S.C. 154(b) by 278 days.

(21) Appl. No.: 14/015,227

(22) Filed: Aug. 30, 2013

(65) Prior Publication Data

US 2015/0067096 A1 Mar. 5, 2015

(51) Int. Cl.
*G06F 17/30* (2006.01)
*H04L 29/08* (2006.01)

(52) U.S. Cl.
CPC ..... *H04L 67/1095* (2013.01); *G06F 17/30174* (2013.01)

(58) Field of Classification Search
CPC .................................. F06F 17/30132
USPC .......................... 707/E17.01, 827
See application file for complete search history.

(56) References Cited

U.S. PATENT DOCUMENTS

| 6,269,371 | B1 | 7/2001 | Ohnishi | |
|---|---|---|---|---|
| 6,754,696 | B1 | 6/2004 | Kamath et al. | |
| 7,693,962 | B2 * | 4/2010 | Serlet | G06F 17/30067 709/219 |
| 9,032,050 | B2 * | 5/2015 | Haeger et al. | 709/219 |
| 9,219,706 | B2 * | 12/2015 | Hom | H04L 61/1523 |
| 2008/0250024 | A1 * | 10/2008 | Kvm | G06F 17/30132 |
| 2011/0145499 | A1 * | 6/2011 | Ananthanarayanan | G06F 12/0866 711/118 |
| 2012/0221520 | A1 * | 8/2012 | Garrett | G06F 17/3089 707/622 |
| 2012/0310880 | A1 * | 12/2012 | Giampaolo | G06F 17/30545 707/610 |
| 2013/0110778 | A1 * | 5/2013 | Taylor | G06F 17/30215 707/624 |
| 2013/0110779 | A1 * | 5/2013 | Taylor | G06F 17/30221 707/624 |
| 2013/0117240 | A1 * | 5/2013 | Taylor | G06F 17/30132 707/690 |
| 2013/0339407 | A1 * | 12/2013 | Sharpe | G06F 17/30194 707/827 |

(Continued)

OTHER PUBLICATIONS

Huizinga D.M., et al., "Mobile File System Support with Virtual Device Drivers", Applied Computing 2002: Proceedings of the 2002 ACM Symposium on Applied Computing; Universidad, Carlos, III De Madrid, Madrid, Spain, Mar. 11-14, 2002, ACM Association for Computing Machinery, US, Mar. 2, 1999, pp. 373-381, XP002154936, ISBN: 978-1-58113-445-2.

(Continued)

*Primary Examiner* — Baoquoc N To
(74) *Attorney, Agent, or Firm* — BainwoodHuang (57) ABSTRACT

One embodiment is directed to a method of providing access to cloud storage performed by a mobile computing device. The method includes (a) receiving a file-level access command to perform a file-level operation on a file of filesystem storage of the mobile computing device, the filesystem storage including remote storage provided by a remote storage platform and locally-cached storage provided by local storage, (b) evaluating whether the file-level access command is directed to a pre-determined portion of the filesystem provided by the remote storage platform, (c) in response to evaluating, if the file-level access command is directed to the pre-determined portion, then performing a synchronization operation to ensure that the file is stored on local storage in synchronization with the remote storage platform, and (d) fulfilling the file-level access command by accessing the local storage once the file is stored on local storage in synchronization with the remote storage platform.

10 Claims, 5 Drawing Sheets

(56) References Cited

U.S. PATENT DOCUMENTS

| | | | |
|---|---|---|---|
| 2014/0006354 A1* | 1/2014 | Parkison | G06F 17/30194 707/649 |
| 2014/0006357 A1* | 1/2014 | Davis | G06F 11/1464 707/667 |
| 2014/0006465 A1* | 1/2014 | Davis | G06F 17/30194 707/827 |
| 2014/0007239 A1* | 1/2014 | Sharpe | G06F 21/561 726/24 |
| 2014/0101434 A1* | 4/2014 | Senthurpandi et al. | 713/150 |
| 2014/0122658 A1* | 5/2014 | Haeger | H04L 29/0854 709/219 |
| 2014/0250069 A1* | 9/2014 | Lakshminarayanan et al. | 707/634 |

OTHER PUBLICATIONS

Chunxia Zhang, et al., "MFS: A Lightweight Block-Level Local Mirror of Remote file System", Journal of Software, vol. 8, No. 6, Jun. 1, 2013, XP055151515.

* cited by examiner

REDIRECTING LOCAL STORAGE TO CLOUD STORAGE

BACKGROUND

Smart phones and other mobile computing devices have become ubiquitous over the past several years. Users often use these devices to access and store documents. Because users may also want to access these documents using other devices (e.g., personal computers) and because mobile computing devices can easily be lost, many cloud service providers have provided mobile applications to allow users to synchronize files on a mobile device with the cloud. In addition, some application developers have added a feature to their mobile applications whereby users can save documents created with those applications to a cloud-based storage service automatically.

SUMMARY

The above-described conventional systems for saving documents to the cloud from a mobile device suffer from deficiencies. For example, a user is required to actively choose to access documents from the cloud. In addition, unless an application developer chooses to implement a cloud-based access feature in its application, the user will not even have the option within the application to access documents stored in the cloud if those documents are not already stored locally on the mobile device.

Thus, it would be desirable to alleviate these concerns by allowing a user to automatically access documents and other files from the cloud using a mobile computing device. It would further be desirable to allow the user to access the cloud from a mobile application even if the developer did not explicitly implement such a feature in the application. Thus, embodiments are directed to automatic techniques for selectively redirecting file-level access commands of local storage of a mobile computing device to the cloud by intercepting file-level access calls directed to a specified area of a filesystem.

One embodiment is directed to a method of redirecting a file-level access command performed by a mobile computing device. The method includes (a) receiving a file-level access command to perform a file-level operation on a file of filesystem storage of the mobile computing device, the filesystem storage including remote storage provided by a remote storage platform and locally-cached storage provided by local storage, (b) evaluating whether the file-level access command is directed to a pre-determined portion of the filesystem provided by the remote storage platform, (c) in response to evaluating, if the file-level access command is directed to the pre-determined portion, then performing a synchronization operation to ensure that the file is stored on local storage in synchronization with the remote storage platform, and (d) fulfilling the file-level access command by accessing the local storage once the file is stored on local storage in synchronization with the remote storage platform. Other embodiments are directed to a computerized apparatus and computer program products for performing methods similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments are directed to automatic techniques for selectively redirecting file-level access commands of local storage of a mobile computing device to the cloud by intercepting file-level access calls directed to a specified area of a filesystem.

Figure 1:
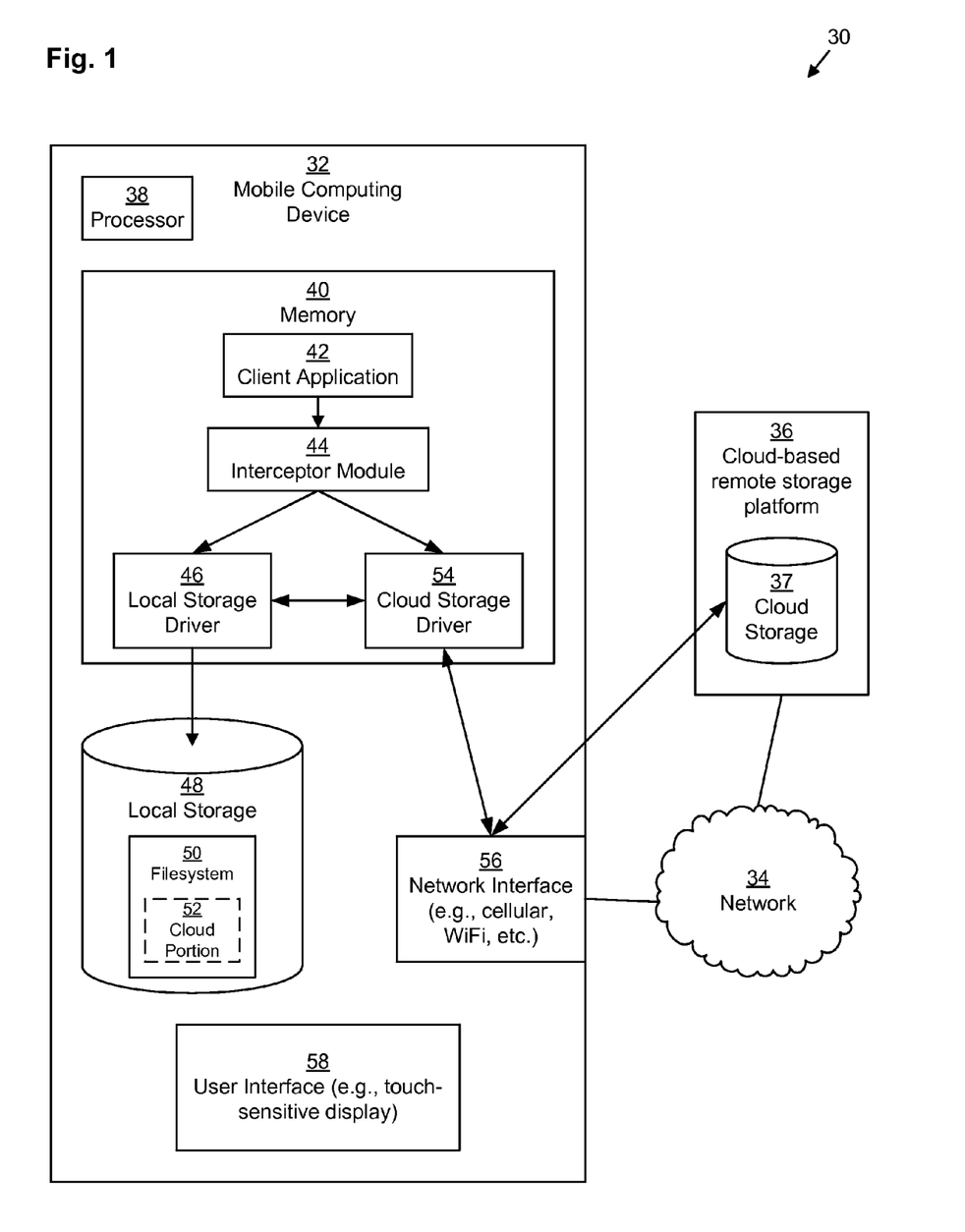
FIG. 1 depicts an example system for use in performing various embodiments.

FIG. 1 depicts an example system 30. System 30 includes a mobile computing device 32 which connects to a network 34, which allows it to access a cloud-based remote storage platform 36 that provides cloud storage 37 for user data.

Mobile computing device 32 may be any kind of network-connectable computing device which is mobile, such as, for example, a cellular phone, a smart phone, a tablet, a laptop computer, etc. Network 34 may be any kind of data communication network, such as for example the Internet, a cellular data network, a wireless local area network, similar systems, and combinations thereof.

Mobile computing device 32 includes a processor 38, memory 40, local storage 48, a network interface 56, and a user interface (UI) 58.

Processor 38 may be any kind of processor or set of processors configured to perform operations, such as, for example, a microprocessor, a multi-core microprocessor, a digital signal processor, a collection of electronic circuits, or any combination of the above.

Network interface 56 interfaces with network 34. Network interface 56 may include a cellular modem, a Wireless Fidelity (WiFi) wireless networking adapter, a Bluetooth adapter, a Near Field Communication adapter, any other device for connecting to a network (especially a wireless network), or some combination thereof.

UI 58 allows the mobile computing device 32 to interact with a user. For example, UI 58 may include a touch-sensitive display screen (e.g., any kind of liquid crystal display capable of receiving touch-based user input) and circuitry for interfacing with such touch-sensitive display screen (e.g., a graphics adapter, a touch-base input controller, etc.) or any combination of display screens and input devices (e.g., keyboard, keypad, mouse, trackpad, tracking ball, pen-based digitizer, stylus-based digitizer, etc.). Typically, the UI 58 is entirely integrated within the mobile computing device 32 (e.g., a screen embedded into a smartphone), although in some embodiments, portions of the UI 58 may be external to the mobile computing device 32.

Memory 40 may be any kind of digital system memory, such as, for example, RAM. Memory 40 stores programs and applications (e.g., mobile apps) executing on processor 38 as well as data used by those programs. Memory 40 stores an operating system (e.g., a version of the Android operating system) (not depicted) as well as various other software modules (some of which may be independent applications, while others are parts of other applications or the operating system). Memory 40 thus includes one or more client applications 42, an interceptor module 44, a local storage driver 46, and a cloud storage driver 54.

Client application 42 is an application which a user may operate to create and access files. One example client application 42 is a document editor. Client application 42 is configured to issue various kinds of file commands to the local storage driver 46, which is part of the operating system. Local storage driver 46 is configured to process all sorts of file commands by accessing local storage 48 on the mobile computing device 32 to, for example, open, close, write, read, delete, move, copy, or create files within a filesystem 50 of the local storage 48. Local storage 48 may be any type of non-volatile local data storage, such as, for example, embedded flash storage, removable flash storage cards (e.g., SecureDigital (SD) or CompactFlash and similar non-volatile memory cards), USB-based removable storage devices, etc.

Interceptor module 44 is a software component which logically interposes between client application 42 and local storage functionality of the local storage driver 46. In some embodiments (see, e.g., FIG. 2), interceptor module 44 is embedded within the local storage driver 46, while, in other embodiments (see, e.g., FIG. 3), interceptor module 44 is embedded within an application wrapper built around client application 42. Functionally, interceptor module 44 serves to intercept file-level access commands issued by client application 42 and redirect file-level access commands which refer to files within a pre-defined cloud portion 52 of filesystem 50 to instead be processed by a cloud storage driver 54 for ultimate fulfillment by cloud storage 37 of the remote cloud-based storage platform 36 instead of (or, in some embodiments, in addition to) being processed locally by the local storage driver 46.

File-level access commands are commands which involve reading metadata of a file, but not altering the contents of the file. Example file-level access commands include file open commands and directory view (also referred to as list) commands, while commands such as file read and file write commands are not file-level access commands.

For example, local storage 48 may store a filesystem 50 prefixed by "/mnt/SD/" while cloud portion 52 is the portion of that filesystem 50 having prefix "/mnt/SD/cloud/" so that any file within /mnt/SD/cloud/ is actually physically located within cloud storage 37, but appears locally via cloud storage driver 54 (although in some cases, the file may also be stored locally). Thus, filesystem 50 is not, strictly speaking, entirely within local storage 48, but logically, filesystem 50 may be seen to be mapped to an address space that appears to be part of local storage 48. In particular, cloud portion 52 may or may not be stored within local storage 48 (depending on the embodiment, none, some, or all files of the cloud portion 52 may be stored within local storage 48), although in any event, cloud portion 52 is stored within cloud storage 37 (except, in certain embodiments in which files of the cloud portion 52 are temporarily stored only on local storage 48 while network access is down).

Typically, cloud portion 52 is managed by a cloud management driver (not depicted), which periodically ensures that locally-stored files within cloud portion 52 are synchronized to the cloud storage 37 version using well-known techniques. An example cloud synchronization product is the Citrix ShareFile service based in Raleigh, N.C. However, although the well-known cloud synchronization products are able to synchronize files that are already locally-stored, they are not able to provide access via the filesystem to files in cloud storage 37 that are not yet locally-stored. Thus, in order to open a file stored within cloud portion 52, cloud storage driver 54 is used to fetch an up-to-date copy of the file from the cloud storage 37 prior to forwarding the open command to the local storage driver 46 for local fulfillment.

Memory 40 may include both a system memory portion for storing programs and data in active use by the processor 38 as well as a persistent storage portion (e.g., solid-state storage and/or disk-based storage) for storing programs and data even while the mobile computing device 32 is powered off. The operating system and the software modules (e.g., 42, 44, 46, 54) are typically stored both in system memory and in persistent storage so that they may be loaded into system memory from persistent storage upon a system restart. Software modules 42, 44, 46, 54, when stored in non-transient form either in system memory or in persistent storage, form a computer program product. The processor 38 running one or more of these software modules 42, 44, 46, 54 thus forms a specialized circuit constructed and arranged to carry out the various processes described herein.

In some embodiments, various components of the mobile computing device 32 (e.g., the processor 38, network interface 56, graphics adapter for the UI 58, various ancillary components, etc.) may be integrated into a single integrated circuit as a system on a chip (SoC), as is known in the art.

Figure 2:
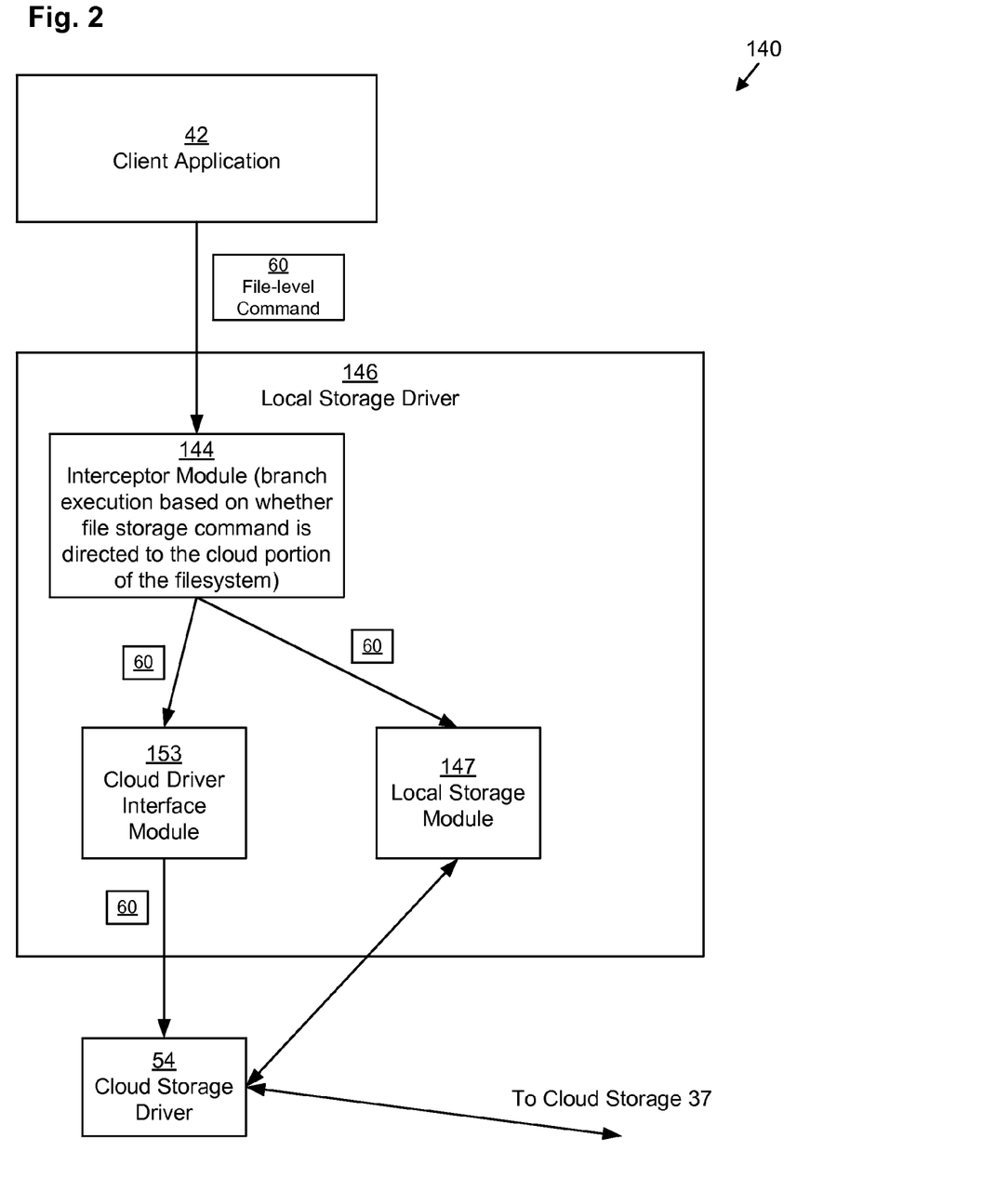
FIG. 2 depicts an example memory configuration according to various embodiments.

FIG. 2 depicts an example arrangement 140 of software modules within memory 40 according to one embodiment. In memory arrangement 140, interceptor module 144 is embedded within local storage driver 146. Thus, client application 42, issues a file-level access command 60 (e.g., file open and directory view commands) to the local storage driver 146, which is intercepted by interceptor module 144 before the file-level access command 60 reaches a local storage module 147 of the local storage driver 146. Local storage module 147 is configured to actually process the file-level access command 60 with reference to local storage 48. However, interceptor module 144 first branches execution based on whether the file-level access command 60 is directed towards the cloud portion 52 of the filesystem 50. If the file-level access command 60 does point towards the cloud portion 52, then the file-level access command 60 is redirected to the cloud storage driver 54 (e.g., via a cloud driver interface module 153 of the local storage driver 146) so that the cloud storage driver 54 can perform preliminary file-level access operations with respect to the cloud storage 37 (e.g., by ensuring that a synchronized copy of the file from the cloud-based remote storage platform 36 is present on the local storage 48) prior to continuing the operation with respect to the local storage 48 by forwarding the file-level access command 60 to the local storage module 147. On the other hand, if the file-level access command 60 does not point towards the cloud portion 52, then the file-level access command 60 is sent directly to the local storage module 147. In either case, once the file-level access command 60 is received by the local storage module 147, the local storage module 147 performs storage operations with respect to the local storage 48.

In some embodiments, when the network interface 56 is unable to connect to the network 34 (e.g., during a network outage), instead of redirecting the file-level access command 60 to the cloud driver interface module 153 when the file-level access command 60 points towards the cloud portion 52, interceptor module 144 sends the file-level access command 60 to the local storage module 147 for local processing just in case the file is already available locally.

Figure 3:
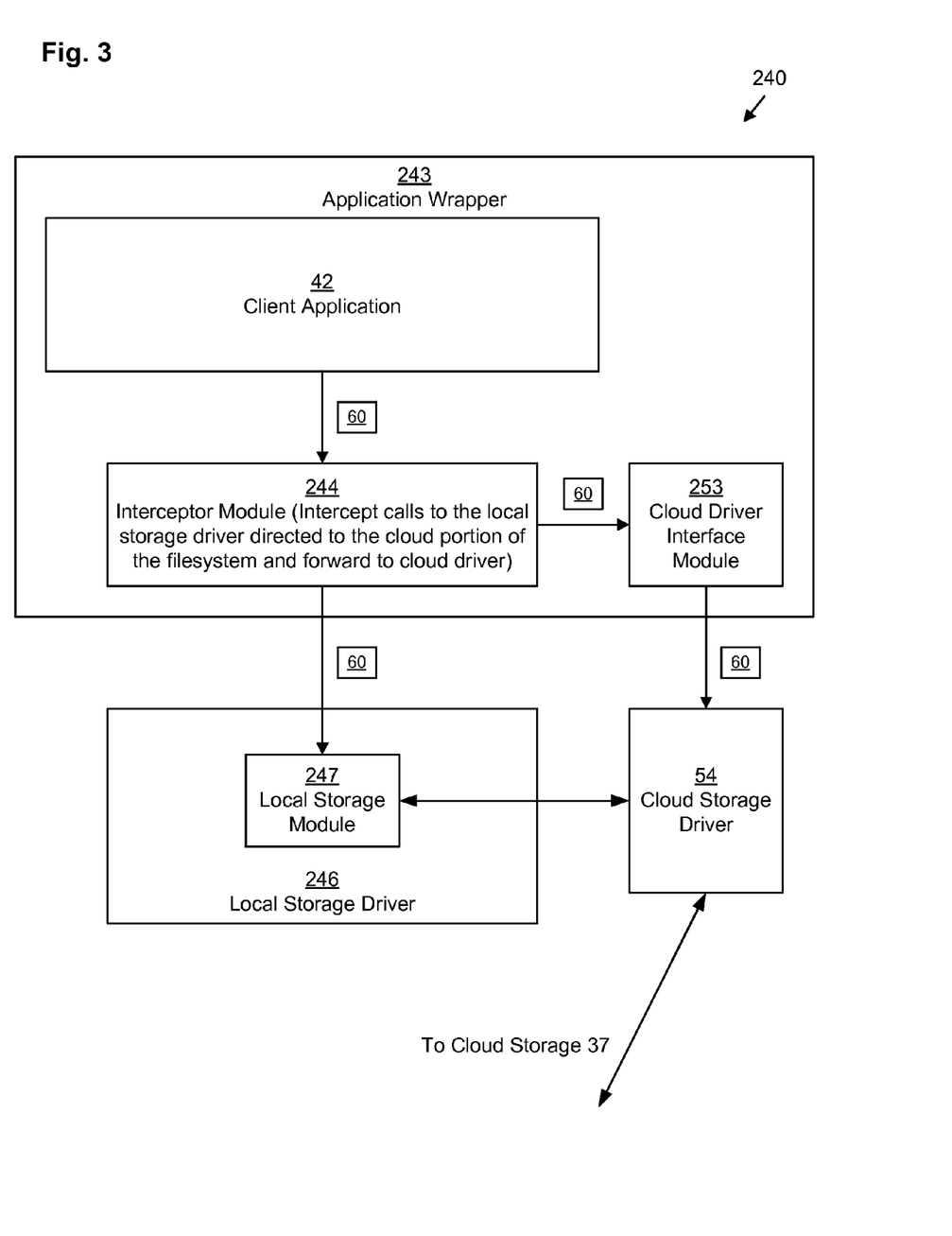
FIG. 3 depicts another example memory configuration according to various embodiments.

FIG. 3 depicts an alternate example arrangement 240 of software modules within memory 40 according to another embodiment. In memory arrangement 240, interceptor module 244 is embedded within an application wrapper 243 that envelops client application 42. Client application 42 is re-linked so that certain system calls made by the client application 42 may be intercepted by library functions defined within the application wrapper. This re-linking is typically performed by the application developer, although it is sometimes possible to re-link the application independently of the application developer. In any event, it is significantly easier for the application developer to re-link the application 42 than it is to add in cloud functionality into the application 42 directly. An example technology used to implement the application wrapper 243 may be, for example, the MDX Vault container produced by Citrix Systems, Inc. of Ft. Lauderdale, Fla. As depicted, interceptor module 244 of the application wrapper 243 intercepts file-level access commands 60 (e.g., file open and directory view commands) issued by the client application 42 to the local storage driver 246 which are directed to the cloud portion 52 and instead redirects those file-level access commands 60 towards the cloud storage driver 54 (e.g., via a cloud driver interface module 253 of the application wrapper 243) so that the cloud storage driver 54 can perform preliminary file-level access operations with respect to the cloud storage 37 (e.g., by ensuring that a synchronized copy of the file from the cloud-based remote storage platform 36 is present on the local storage 48) prior to continuing the operation with respect to the local storage 48 by forwarding the file-level access command 60 to the local storage driver 246. Otherwise, interceptor module 244 allows other file-level access commands 60 to pass through directly to the local storage driver 46. In either case, once received by the local storage driver 246, local storage module 247 is able to perform the storage operation exclusively with respect to the local storage 48.

In some embodiments, when the network interface 56 is unable to connect to the network 34 (e.g., during a network outage), instead of redirecting the file-level access command 60 to the cloud driver interface module 253 when the file-level access command 60 points towards the cloud portion 52, interceptor module 244 sends the file-level access command 60 to the local storage driver 246 for local processing just in case the file is already available locally.

Figure 4:
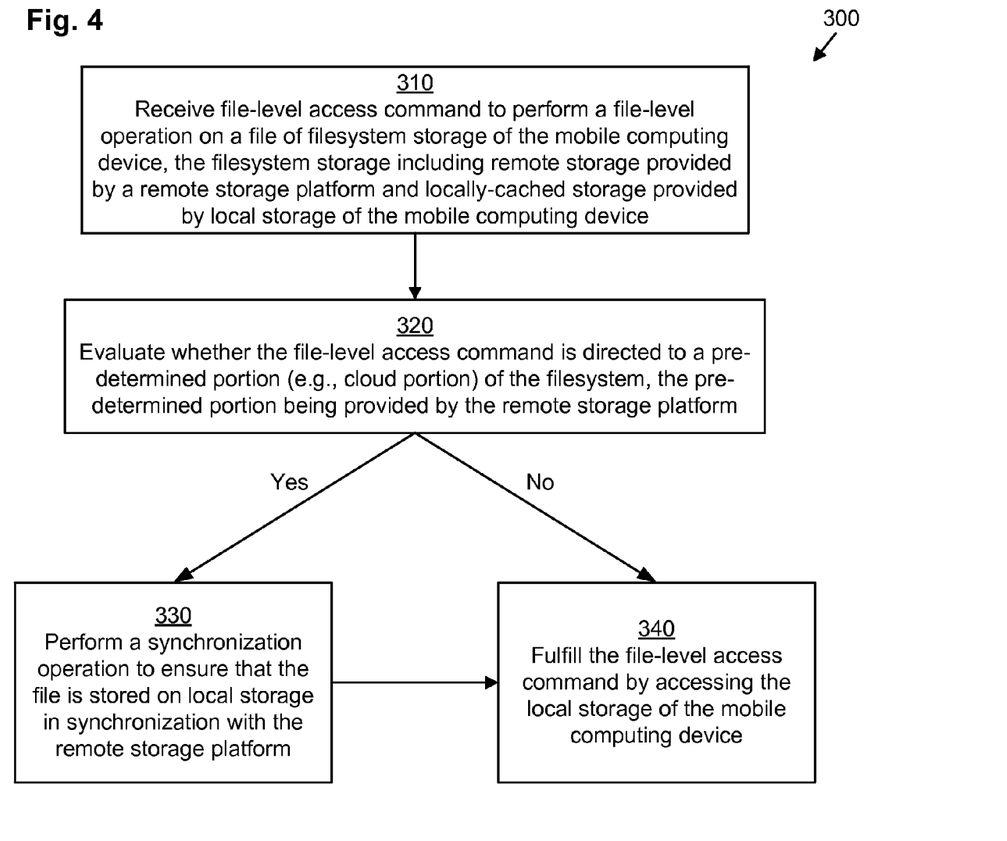
FIG. 4 depicts an example method according to various embodiments.

FIG. 4 illustrates, as method 300, the operation of interceptor module 44, local storage driver 46, and cloud storage driver 54 on mobile computing device 32 for selectively redirecting access to local storage 48 to the cloud by intercepting file-level access commands 60 directed to the cloud portion 52 of filesystem 50. It should be understood that any time a piece of software, such as, for example, interceptor module 44, local storage driver 46, and/or cloud storage driver 54 is described as performing a method, process, step, or function, in actuality what is meant is that a computing device (e.g., mobile computing device 32) on which that piece of software is running performs the method, process, step, or function when executing that piece of software on its processor (e.g., processor 38). It should also be understood that, in some embodiments, instead of processor 38 executing code of interceptor module 44, local storage driver 46, and/or cloud storage driver 54, specialized circuitry of the mobile computing device 32 operates to perform the method, process, step, or function directly in hardware.

In step 310, interceptor module 44 receives a file-level access command 60 to access the filesystem 50 addressable by the mobile computing device 32. In the embodiment of FIG. 2, interceptor module 144 receives the file-level access command 60 once received by the local storage driver 146, while, in the embodiment of FIG. 3, interceptor module 244 receives the file-level access command 60 prior to reaching the local storage driver 246. In some cases, the file-level access command 60 may be a file open command, while in other cases, file-level access command 60 may be a directory view command, or, in certain embodiments, certain other kinds of file-level access commands. However, in many embodiments, only certain specific kinds of file-level access commands (e.g., file open and directory view commands) are intercepted by interceptor module 44, all other file-level access commands being functionally treated as equivalent to non-file-level access commands. Non-file-level access commands (including commands treated as functionally equivalent to non-file-level access commands) may bypass the cloud storage driver 54 because the traditional cloud management driver (operating in parallel with the cloud driver 54 as a background process) is already responsible for ensuring that files already stored locally on local storage 48 within cloud portion 52 are synchronized with the cloud storage 37.

In step 320, interceptor module 44 performs an evaluation operation to evaluate whether the file-level access command 60 is directed to the pre-determined portion (e.g., the cloud portion 52 having address prefix /mnt/SD/cloud/) of the filesystem 50.

When step 320 yields a positive result, operation proceeds with step 330. In step 330, cloud storage driver 54 performs a synchronization operation to ensure that the file (or directory) at which the command 60 is directed is in synchronization with the remote storage platform 36. This primarily involves making sure that the file is stored locally (fetching it from cloud storage 37 if it is not already locally-stored), although it may also involve (especially in the case of a directory view command) performing an up-to-date synchronization of a file or directory already stored locally (e.g., using techniques similar to those found in the cloud management driver). Further details with respect to step 320 will be provided below in connection with FIG. 5.

Upon completing step 330, operation proceeds with step 340. When step 320 yields a negative result, operation proceeds directly with step 340.

In step 340, local storage driver 46 fulfills the file-level access command 60 by accessing (via local storage module 147, 247) the filesystem 50 on the local storage 48. This may be done because, whether or not the file (or directory) was previously stored locally, after operation of step 320 (and step 330, when needed) the file (or directory) is now stored locally (in a synchronized state, with respect to files within cloud portion 52).

In the event that there is more storage space within cloud storage 37 than within local storage 48, various algorithms (e.g., least-recently-accessed) may be used to remove data from the locally-stored version of the cloud portion 52 of local storage 48 while preserving it within the cloud storage 37 version of the cloud portion 52.

Method 300 is particularly useful when the locally-cached contents of the cloud portion 52 on local storage 48 are not identical to the full contents of the cloud storage 37 (i.e., certain files are not present within the locally-cached contents of the cloud portion 52). For example, when a user wishes to view a directory within cloud portion 52 (e.g., the /mnt/SD/cloud/special/ directory) which contains files that are not stored locally on local storage 48, using a legacy document editor application as client application 42, the user will traditionally not be able to see the files that are not stored locally (e.g., /mnt/SD/cloud/special/newfile.doc).

However, via method 300, the user is able to do so. So, when the user wishes to access the /mnt/SD/cloud/special/ directory, the client application 42 sends a directory view command targeting /mnt/SD/cloud/special/ as command 60 towards local storage driver 46, but interceptor module 44 intercepts the command 60 and makes sure that the version of the directory file stored on local storage 48 includes a listing of all files within the /mnt/SD/cloud/special/ directory on cloud storage 37 prior to the command 60 being executed by the local storage module 147, 247. Thus, the user is able to see the existence of /mnt/SD/cloud/special/newfile.doc via a directory listing displayed via UI 58 even though that file is not stored locally. Then, when the user wishes to actually open the /mnt/SD/cloud/special/newfile.doc file, client application 44 sends a file open command targeting /mnt/SD/cloud/special/newfile.doc as command 60 towards local storage driver 46, but interceptor module 44 intercepts the command 60 and makes sure that the /mnt/SD/cloud/special/newfile.doc file is fetched from cloud storage 37 and stored on local storage 48 prior to the command 60 being executed by the local storage module 147, 247.

Figure 5:
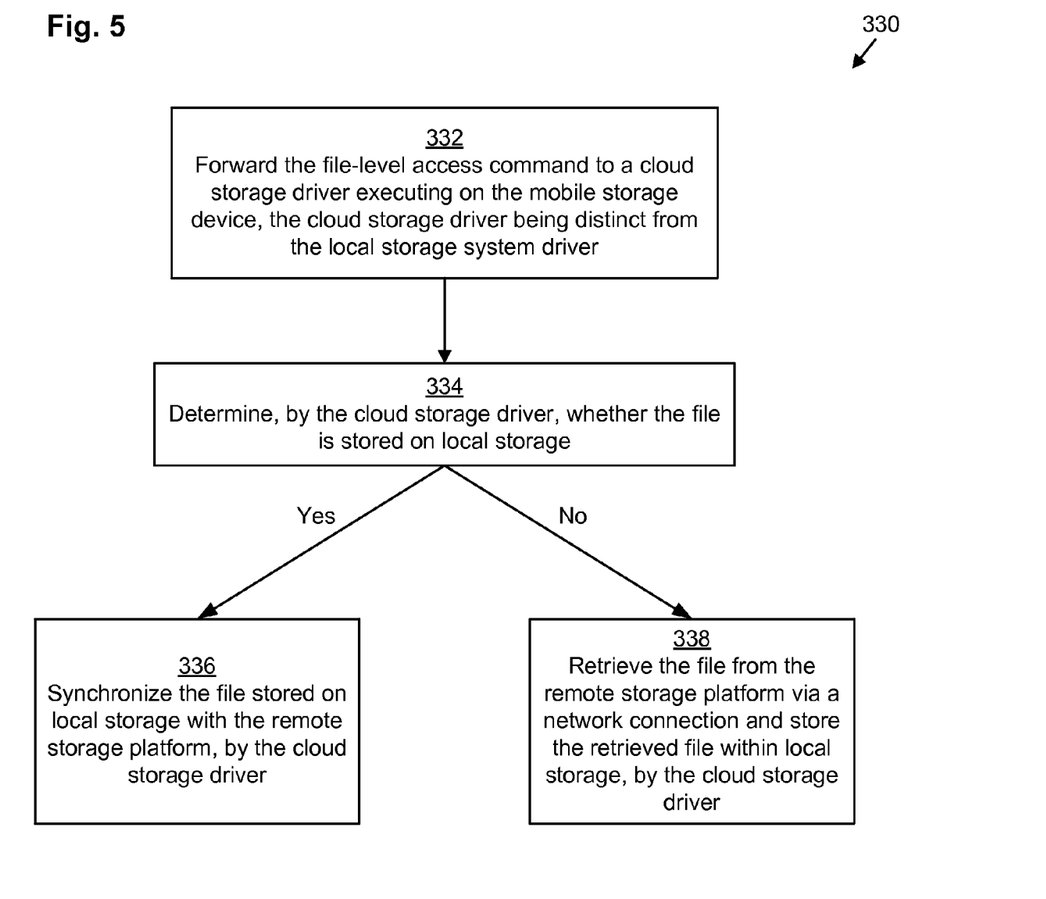
FIG. 5 depicts an example method according to various embodiments.

FIG. 5 depicts the operation of step 330 in further detail. In sub-step 332, interceptor module 44 forwards the file-level access command 60 to the cloud storage driver 54. In the context of FIG. 2, this is done by interceptor module 144 forwarding command 60 to cloud driver interface module 153 within local storage driver 146, and then cloud driver interface module 153 forwarding the command 60 on to cloud storage driver 54. In the context of FIG. 3, this is done by interceptor module 244 forwarding command 60 to cloud driver interface module 253 within application wrapper 243, and then cloud driver interface module 253 forwarding the command 60 on to cloud storage driver 54.

In step 334, the cloud storage driver 54 determines whether or not the file (or directory) at which the command 60 is targeted is stored on local storage 48. Cloud storage driver 54 typically interfaces with local storage module 147, 247 in order to make this determination. Thus, in some embodiments, cloud storage driver 54 may send a request to local storage module 147, 247 to request confirmation of the presence of the file (or directory) in question. In other embodiments, cloud storage driver 54 requests a directory listing from local storage module 147, 247 and then determines itself whether the directory listing includes the target file (or directory).

Step 336 is performed when the cloud storage driver 54 has determined that the target file (or directory) is already present on the local storage 48. In step 336, cloud storage driver 54 synchronizes the contents of the target file (or directory) already locally-cached within local storage with the version from cloud storage 37 (via network interface 56 and network 34) using well-known techniques. In some embodiments, this step may involve making a function call to the cloud management driver, while, in other embodiments, this step may involve executing code similar to code found within the cloud management driver.

Step 338 is performed when the cloud storage driver 54 has determined that the target file (or directory) is not already present on the local storage 48. In step 336, cloud storage driver 54 retrieves (or fetches) the target file (or directory) from the cloud storage 37 on cloud-based remote storage platform 36 via network interface 56 and network 34 and then stores the fetched file locally on local storage 48 (within cloud portion 52).

Thus, techniques have been described for selectively redirecting file-level access commands of local storage 48 of a mobile computing device 32 to the cloud by intercepting file-level access calls 60 directed to a specified area 52 of a filesystem 50.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A method of providing access to cloud storage performed by a mobile computing device, the method comprising:

receiving a file-level access command to perform a file-level operation on a file of filesystem storage of the mobile computing device, the filesystem storage including remote storage provided by a remote storage platform and locally-cached storage provided by local storage of the mobile computing device, the file-level access command originating at a user application running on the mobile computing device, wherein receiving the file-level access command includes intercepting the file-level access command from the user application by a user application wrapper linked into the user application, the user application wrapper logically interposing between the user application and an operating system of the mobile computing device, the user application wrapper being built around the user application;

evaluating, by the user application wrapper, whether the file-level access command is directed to a pre-determined portion of the filesystem, the pre-determined portion being provided by the remote storage platform;

in response to evaluating, if the file-level access command is directed to the pre-determined portion, then performing a synchronization operation to ensure that the file is stored on local storage in synchronization with the remote storage platform, wherein performing the synchronization operation includes:

forwarding the file-level access command from the user application wrapper to a cloud storage driver executing on the mobile storage device, the cloud storage driver executing outside of the user application wrapper;

determining, by the cloud storage driver, whether the file is stored on local storage;

if the file is stored on local storage, then synchronizing the file stored on local storage with the remote storage platform, by the cloud storage driver; and if the file is not stored on local storage, then retrieving the file from the remote storage platform via a network connection and storing the retrieved file within local storage, by the cloud storage driver; and fulfilling the file-level access command by accessing the filesystem storage of the mobile computing device once the file is stored on local storage in synchronization with the remote storage platform, including:

forwarding the file-level access command from the user application wrapper to a local storage system driver executing on the mobile storage device, the cloud storage driver being distinct from the local storage system driver and the local storage system driver executing outside of the user application wrapper; and providing access to the filesystem storage by the local storage system driver in accordance with the file-level access command.

2. The method of claim 1 wherein the local storage system driver is a Secure Digital (SD) storage driver.

3. The method of claim 1 wherein:
the file-level access command is directed to the pre-determined portion of the filesystem;
the file-level access command is a file open command; and
the file is not locally stored within locally-cached storage.

4. The method of claim 1 wherein:
the file-level access command is directed to the pre-determined portion of the filesystem;
the file-level access command is a directory view command directed toward a directory file; and
fulfilling the file-level access command by accessing the local storage once the file is stored on local storage in synchronization with the remote storage platform includes displaying a list of files listed in the fetched directory file even though at least one file listed in the fetched directory file is not locally stored within locally-cached storage.

5. The method of claim 4 wherein the method further comprises:
receiving a file open command for a second file listed in the fetched directory file, the second file not being locally stored within locally-cached storage;
fetching the second file by the cloud storage driver from the remote storage platform and placing the fetched second file into the locally-cached storage; and
opening the fetched second file within locally-cached storage.

6. A computer program product comprising a non-transitory computer-readable storage medium storing a set of instructions, which, when executed by a mobile computing device, cause the mobile computing device to perform the following operations:
intercepting a file-level access command to perform a file-level operation on a file of filesystem storage of the mobile computing device originating from a user application running on the mobile computing device by a user application wrapper linked into the user application, the user application wrapper logically interposing between the user application and an operating system of the mobile computing device, the user application wrapper being built around the user application, the filesystem storage including remote storage provided by a remote storage platform and locally-cached storage provided by local storage of the mobile computing device;

evaluating, by the user application wrapper, whether the file-level access command is directed to a pre-determined portion of the filesystem, the pre-determined portion being provided by the remote storage platform;

in response to evaluating, if the file-level access command is directed to the pre-determined portion, then causing a synchronization operation to be performed to ensure that the file is stored on local storage in synchronization with the remote storage platform by:

forwarding the file-level access command from the application wrapper to a cloud storage driver executing on the mobile storage device, the cloud storage driver executing outside of the user application wrapper;

determining, by the cloud storage driver, whether the file is stored on local storage;

if the file is stored on local storage, then synchronizing the file stored on local storage with the remote storage platform, by the cloud storage driver; and if the file is not stored on local storage, then, by the cloud storage driver, retrieving the file from the remote storage platform via a network connection and storing the retrieved file within local storage; and fulfilling the file-level access command by accessing the filesystem storage of the mobile computing device once the file is stored on local storage in synchronization with the remote storage platform by:

forwarding the file-level access command from the user application wrapper to a local storage system driver executing on the mobile storage device, the cloud storage driver being distinct from the local storage system driver and the local storage system driver executing outside of the user application wrapper; and providing access to the filesystem storage by the local storage system driver in accordance with the file-level access command.

7. The computer program product of claim 6 wherein the local storage system driver is a Secure Digital (SD) storage driver.

8. The computer program product of claim 6 wherein:
the file-level access command is directed to the pre-determined portion of the filesystem;
the file-level access command is a file open command; and the file is not locally stored within locally-cached storage.

9. The computer program product of claim 6 wherein:
the file-level access command is directed to the pre-determined portion of the filesystem;
the file-level access command is a directory view command directed toward a directory file; and
providing access to the filesystem storage by the local storage system driver in accordance with the file-level access command includes displaying a list of files listed in the directory file even though at least one file listed in the directory file is not locally stored within locally-cached storage.

10. The computer program product of claim 9 wherein the instructions, when executed by the mobile computing device, further cause the mobile computing device to perform the following operations:
intercepting a file open command for a second file listed in the directory file originating from the user application running on the mobile computing device by the user application wrapper, the second file not being locally stored within locally-cached storage;

fetching the second file by the cloud storage driver from the remote storage platform and placing the fetched second file into the locally-cached storage; and opening the fetched second file within locally-cached storage.

* * * * *